(12) United States Patent
Rezende et al.

(10) Patent No.: US 9,304,668 B2
(45) Date of Patent: Apr. 5, 2016

(54) METHOD AND APPARATUS FOR CUSTOMIZING A DISPLAY SCREEN OF A USER INTERFACE

(75) Inventors: Antonio Pedro Rezende, London (GB); Guilherme Schneider, London (GB); Priya Prakash, London (GB)

(73) Assignee: Nokia Technologies Oy, Espoo (FI)

( * ) Notice: Subject to any disclaimer, the term of this patent is extended or adjusted under 35 U.S.C. 154(b) by 65 days.

(21) Appl. No.: 13/170,825

(22) Filed: Jun. 28, 2011

(65) Prior Publication Data

US 2013/0002706 A1    Jan. 3, 2013

(51) Int. Cl.
- G09G 5/00 (2006.01)
- G06F 3/0484 (2013.01)
- G06F 3/0481 (2013.01)
- G06F 3/0486 (2013.01)
- G06F 3/0488 (2013.01)

(52) U.S. Cl.
CPC .......... G06F 3/04845 (2013.01); G06F 3/0486 (2013.01); G06F 3/04817 (2013.01); G06F 3/04842 (2013.01); G06F 3/04883 (2013.01)

(58) Field of Classification Search
USPC ........................................................ 715/835
See application file for complete search history.

(56) References Cited

U.S. PATENT DOCUMENTS

| | | | | |
|---|---|---|---|---|
| 5,546,528 A * | 8/1996 | Johnston | ............... | G06F 3/0481 715/807 |
| 5,760,774 A * | 6/1998 | Grossman | ............. | G06F 3/0481 715/835 |
| 6,003,034 A * | 12/1999 | Tuli | .................... | G06F 17/30067 |
| 6,668,177 B2 * | 12/2003 | Salmimaa | ........... | G06F 3/04817 455/456.3 |
| 6,756,999 B2 * | 6/2004 | Stoakley et al. | ............... | 715/779 |
| 7,603,628 B2 * | 10/2009 | Park et al. | ...................... | 715/764 |
| 8,042,110 B1 * | 10/2011 | Kawahara | ............. | G06F 9/4443 715/764 |
| 8,266,550 B1 * | 9/2012 | Cleron et al. | .................. | 715/863 |
| 2003/0112280 A1 * | 6/2003 | Driskell | ............... | G06F 3/0482 715/835 |
| 2004/0017401 A1 * | 1/2004 | Strong et al. | .................. | 345/821 |
| 2006/0112354 A1 * | 5/2006 | Park | ...................... | G06F 3/0481 715/835 |
| 2008/0184112 A1 * | 7/2008 | Chiang et al. | .................. | 715/700 |
| 2008/0189614 A1 * | 8/2008 | Jeong et al. | .................... | 715/716 |
| 2009/0215497 A1 * | 8/2009 | Louch | ........................... | 455/566 |
| 2010/0197219 A1 * | 8/2010 | Issa | ......................... | H04H 20/57 455/3.06 |
| 2010/0257196 A1 * | 10/2010 | Waters et al. | .................. | 707/769 |
| 2010/0329642 A1 * | 12/2010 | Kam | ................... | G06F 3/04817 386/280 |
| 2011/0166777 A1 * | 7/2011 | Chavakula | ..................... | 701/201 |
| 2011/0252380 A1 * | 10/2011 | Chaudhri | ...................... | 715/836 |
| 2012/0177191 A1 * | 7/2012 | Tam | .......................... | 379/201.03 |

* cited by examiner

*Primary Examiner* — William Bashore
*Assistant Examiner* — Nathan Shrewsbury
(74) *Attorney, Agent, or Firm* — Alston & Bird LLP

(57) ABSTRACT

A method is provided for controlling and customizing a display screen of a user interface which includes at least two sections of display elements with the display elements of one section being displayed in a different manner, such as being sized greater, than the display elements of another section. The method also defines a spatial relationship of the at least two sections. The method also includes receiving an input indicating a selection of a display element and causing the performance of an operation associated with the display element. A corresponding apparatus and computer program product are also provided.

23 Claims, 13 Drawing Sheets

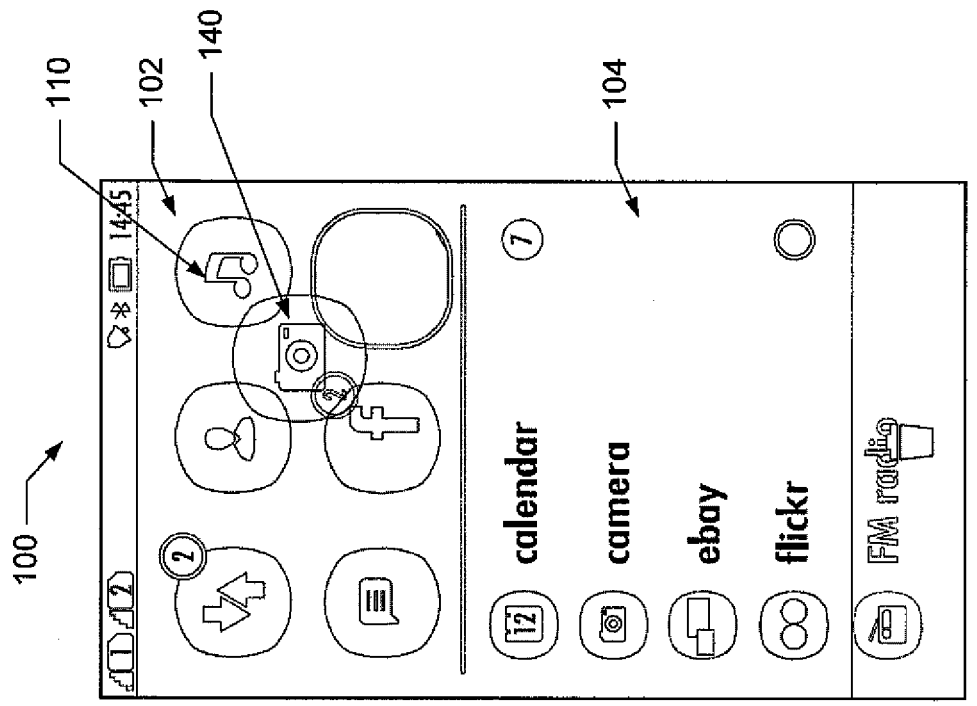
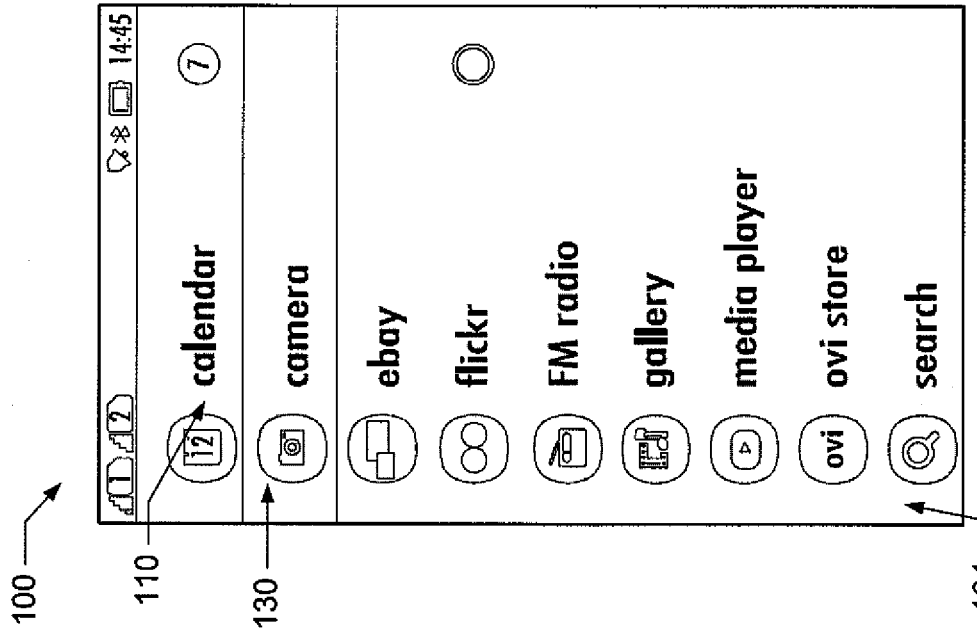
FIG. 7B
FIG. 7A

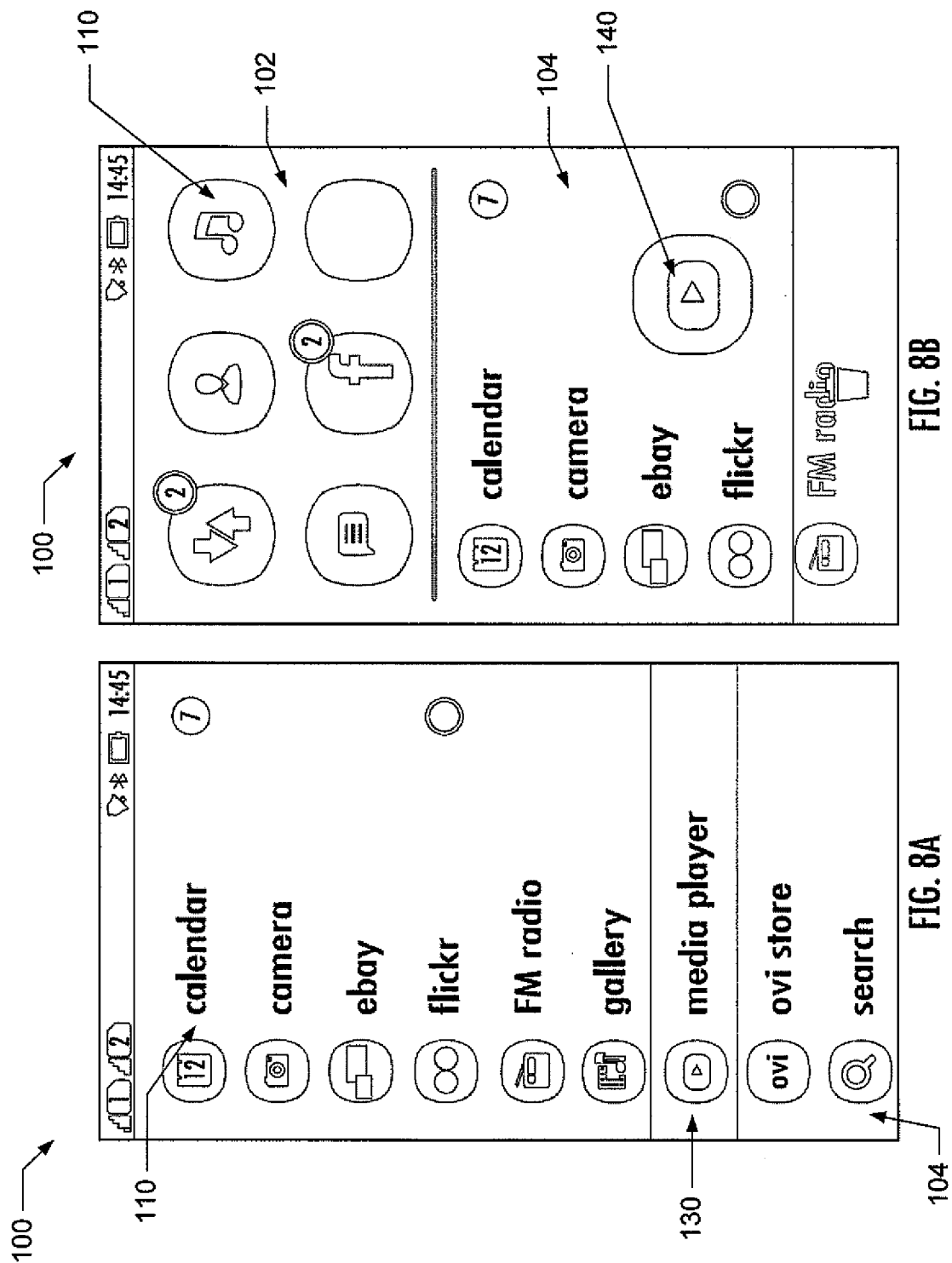

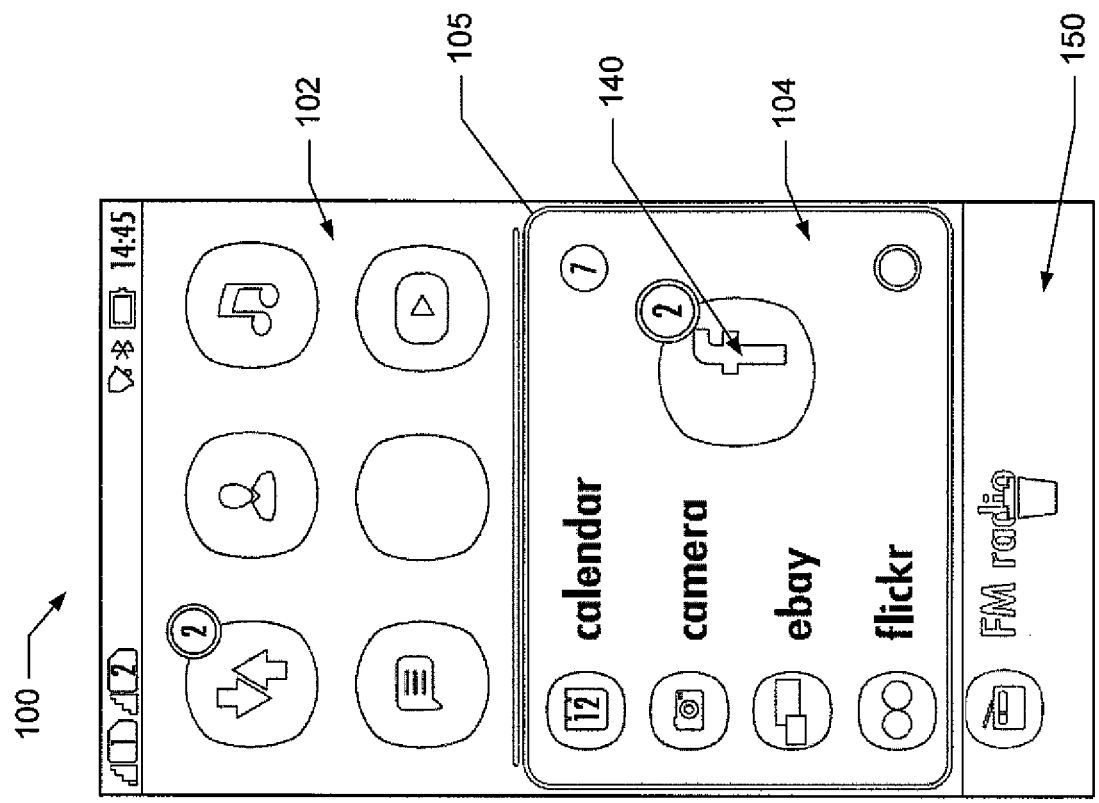
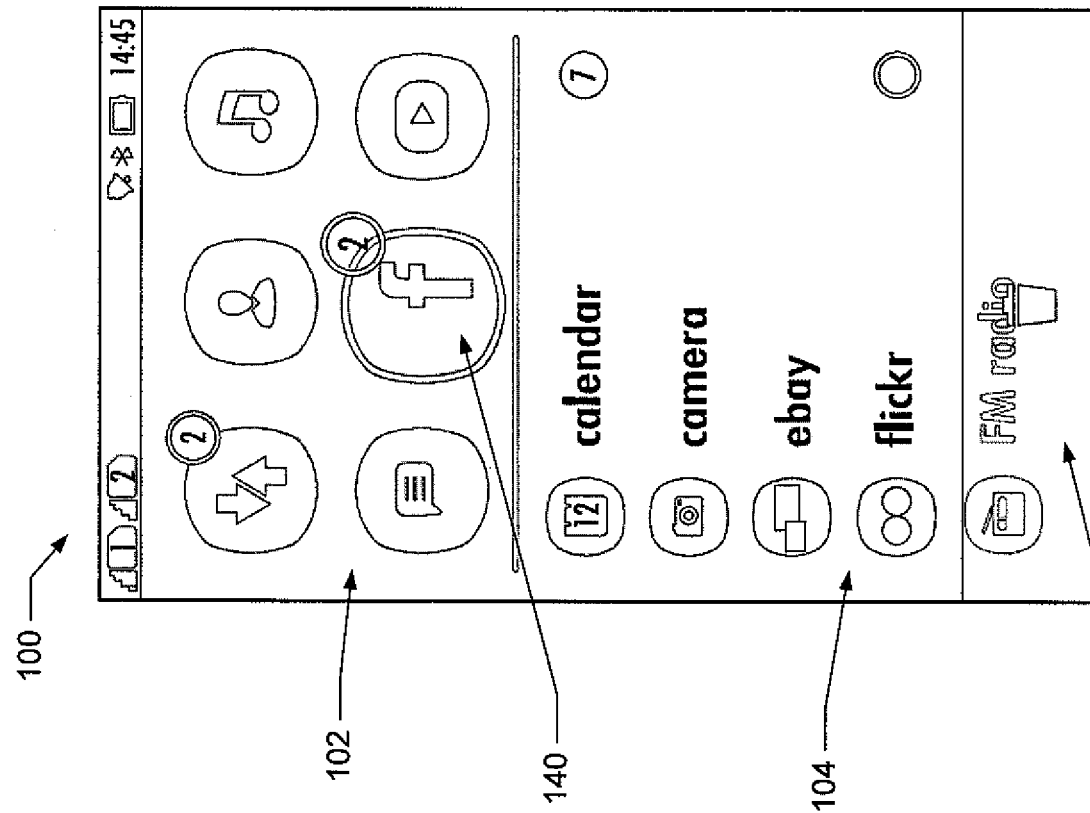
FIG. 11A
FIG. 11B

METHOD AND APPARATUS FOR CUSTOMIZING A DISPLAY SCREEN OF A USER INTERFACE

TECHNOLOGICAL FIELD

Some example embodiments of the present invention relate generally to user interface technology and, more particularly, relate to a method and apparatus for customizing and controlling a display screen of a user interface, which may display multiple groups of display elements.

BACKGROUND

The modern communications era has brought about a tremendous expansion of wireline and wireless networks. Wireless and mobile networking technologies have addressed related consumer demands, while providing more flexibility and immediacy of information transfer. Concurrent with the expansion of networking technologies, an expansion in computing power has resulted in development of affordable computing devices capable of taking advantage of services made possible by modern networking technologies. This expansion in computing power has led to a reduction in the size of computing devices and given rise to a new generation of mobile devices that are capable of performing functionality that only a few years ago required processing power that could be provided only by the most advanced desktop computers. Consequently, mobile computing devices having a small form factor have become ubiquitous and are used to access network applications and services by a number of consumers.

As the evolution of power and affordability of modern computing devices has included the release of computing devices capable of performing numerous functions, a need for enhanced user interface technologies has developed. For example, modern computing devices are capable of running a number of applications, programs, and/or functions. As such, a computing device may include a display screen, such as a homescreen, capable of displaying the numerous applications and programs the computing device is capable of performing. Such applications and programs may be represented by thumbnails, icons, and/or other display indicators or elements.

Because a modern computing device may be capable of operating a number of applications and/or programs, it may be difficult for a user to navigate through a display screen that presents the thumbnails, icons, and/or other display elements representative of those applications and/or programs. Further, a user may become frustrated when attempting to locate a particular application and/or program frequently used if the user has to repeatedly search through an expansive display of icons or display elements representative of all of the available the applications and/or programs.

BRIEF SUMMARY

A method, apparatus and computer program product are provided to permit a user to control and customize a display screen, such as a homescreen, of a user interface. As such, a user may more readily control the user interface according to individual preferences and/or the contextual state of the device. The method, apparatus, and computer program product of one example embodiment also provides a user with the ability to cause the display elements associated with certain applications and/or programs to be presented in an enhanced manner relative to other display elements for applications and/or programs so as to facilitate the user's identification of those applications and/or programs.

BRIEF DESCRIPTION OF THE SEVERAL VIEWS OF THE DRAWINGS

Figure 1:
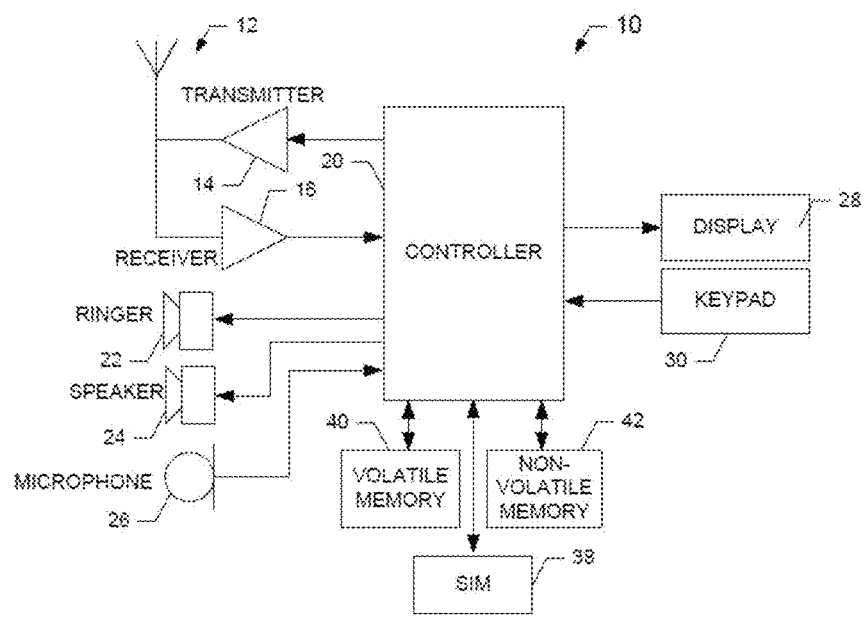
Figure 2:
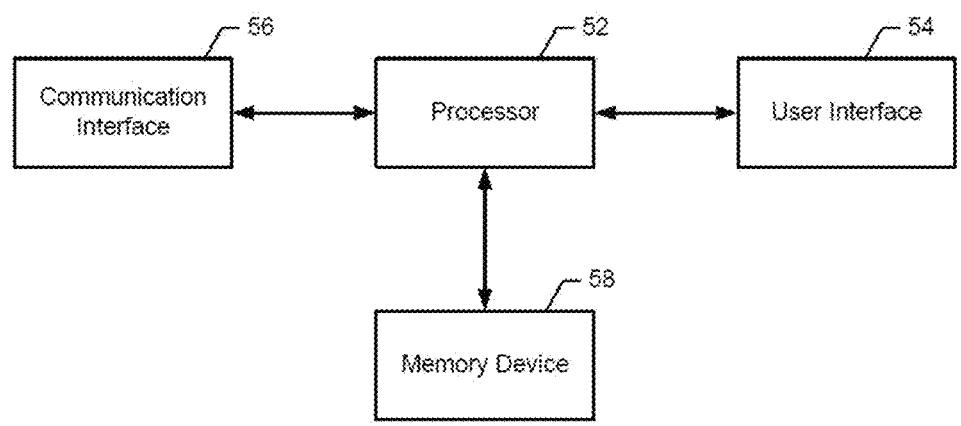
Figure 3:
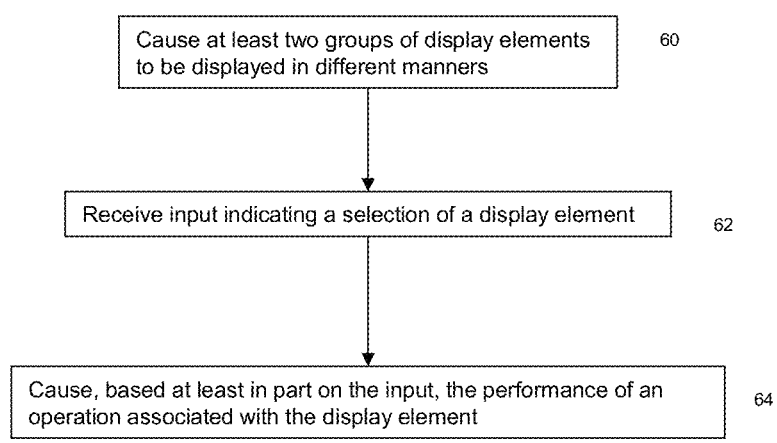

Having thus described embodiments of the invention in general terms, reference will now be made to the accompanying drawings, which are not necessarily drawn to scale, and wherein:

FIG. 1 is a schematic block diagram of a mobile terminal according to an example embodiment of the present invention;

FIG. 2 is a schematic block diagram of an apparatus for controlling and customizing a display screen of a user interface according to an example embodiment of the present invention;

FIG. 3 is a flowchart illustrating operations performed according to an example embodiment of the present invention; and FIGS. 4-11e illustrate a plurality of screens of display elements that may be presented when operating a display screen according to an example embodiment of the present invention.

DETAILED DESCRIPTION

Some embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

As used herein, the terms "data," "content," "information" and similar terms may be used interchangeably to refer to data capable of being transmitted, received, displayed and/or stored in accordance with various example embodiments. Thus, use of any such terms should not be taken to limit the spirit and scope of the disclosure.

The term "computer-readable medium" as used herein refers to any medium configured to participate in providing information to a processor, including instructions for execution. Such a medium may take many forms, including, but not limited to a non-transitory computer-readable storage medium (e.g., non-volatile media, volatile media), and transmission media. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Examples of non-transitory computer-readable media include a magnetic computer readable medium (e.g., a floppy disk, hard disk, magnetic tape, any other magnetic medium), an optical computer readable medium (e.g., a compact disc read only memory (CD-ROM), a digital versatile disc (DVD), a Blu-Ray disc, or the like), a random access memory (RAM), a programmable read only memory (PROM), an erasable programmable read only memory (EPROM), a FLASH-EPROM, or any other non-transitory medium from which a computer can read. The term computer-readable storage medium is used herein to refer to any computer-readable medium except transmission media.

However, it will be appreciated that where embodiments are described to use a computer-readable storage medium, other types of computer-readable mediums may be substituted for or used in addition to the computer-readable storage medium in alternative embodiments.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

FIG. 1, one example embodiment, illustrates a block diagram of a mobile terminal 10 that would benefit from embodiments of the present invention. It should be understood, however, that the mobile terminal 10 as illustrated and hereinafter described is merely illustrative of one type of device that may benefit from embodiments of the present invention and, therefore, should not be taken to limit the scope of embodiments of the present invention. As such, although numerous types of mobile terminals, such as portable digital assistants (PDAs), mobile telephones, pagers, mobile televisions, gaming devices, laptop computers, cameras, tablet computers, touch surfaces, wearable devices, video recorders, audio/video players, radios, electronic books, positioning devices (e.g., global positioning system (GPS) devices), or any combination of the aforementioned, and other types of voice and text communications systems, may readily employ embodiments of the present invention, other devices including fixed (non-mobile) electronic devices may also employ some example embodiments.

The mobile terminal 10 may include an antenna 12 (or multiple antennas) in operable communication with a transmitter 14 and a receiver 16. The mobile terminal 10 may further include an apparatus, such as a processor 20 or other processing device (e.g., processor 52 of FIG. 2), which controls the provision of signals to and the receipt of signals from the transmitter 14 and receiver 16, respectively. The signals may include signaling information in accordance with the air interface standard of the applicable cellular system, and also user speech, received data and/or user generated data. In this regard, the mobile terminal 10 is capable of operating with one or more air interface standards, communication protocols, modulation types, and access types. By way of illustration, the mobile terminal 10 is capable of operating in accordance with any of a number of first, second, third and/or fourth-generation communication protocols or the like. For example, the mobile terminal 10 may be capable of operating in accordance with second-generation (2G) wireless communication protocols IS-136 (time division multiple access (TDMA)), GSM (global system for mobile communication), and IS-95 (code division multiple access (CDMA)), or with third-generation (3G) wireless communication protocols, such as Universal Mobile Telecommunications System (UMTS), CDMA2000, wideband CDMA (WCDMA) and time division-synchronous CDMA (TD-SCDMA), with 3.9G wireless communication protocol such as evolved UMTS Terrestrial Radio Access Network (E-UTRAN), with fourth-generation (4G) wireless communication protocols (e.g., Long Term Evolution (LTE) or LTE-Advanced (LTE-A) or the like. As an alternative (or additionally), the mobile terminal 10 may be capable of operating in accordance with non-cellular communication mechanisms. For example, the mobile terminal 10 may be capable of communication in a wireless local area network (WLAN) or other communication networks.

In some embodiments, the processor 20 may include circuitry desirable for implementing audio and logic functions of the mobile terminal 10. For example, the processor 20 may be comprised of a digital signal processor device, a microprocessor device, and various analog to digital converters, digital to analog converters, and other support circuits. Control and signal processing functions of the mobile terminal 10 are allocated between these devices according to their respective capabilities. The processor 20 thus may also include the functionality to convolutionally encode and interleave message and data prior to modulation and transmission. The processor 20 may additionally include an internal voice coder, and may include an internal data modem. Further, the processor 20 may include functionality to operate one or more software programs, which may be stored in memory. For example, the processor 20 may be capable of operating a connectivity program, such as a conventional Web browser. The connectivity program may then allow the mobile terminal 10 to transmit and receive Web content, such as location-based content and/or other web page content, according to a Wireless Application Protocol (WAP), Hypertext Transfer Protocol (HTTP) and/or the like, for example.

The mobile terminal 10 may also comprise a user interface including an output device such as a conventional earphone or speaker 24, a ringer 22, a microphone 26, a display 28, and a user input interface, all of which are coupled to the processor 20. The user input interface, which allows the mobile terminal 10 to receive data, may include any of a number of devices allowing the mobile terminal 10 to receive data, such as a keypad 30, a touch display (display 28 providing an example of such a touch display) or other input device. In embodiments including the keypad 30, the keypad 30 may include the conventional numeric (0-9) and related keys (#, *), and other hard and soft keys used for operating the mobile terminal 10. Alternatively or additionally, the keypad 30 may include a conventional QWERTY keypad arrangement. The keypad 30 may also include various soft keys with associated functions. In addition, or alternatively, the mobile terminal 10 may include an interface device such as a joystick or other user input interface. Some embodiments employing a touch display may omit the keypad 30 and any or all of the speaker 24, ringer 22, and microphone 26 entirely. The mobile terminal 10 further includes a battery 34, such as a vibrating battery pack, for powering various circuits that are required to operate the mobile terminal 10, as well as optionally providing mechanical vibration as a detectable output.

As noted above, the display 28 may be a touch screen display. In this embodiment, the touch screen display may be configured to visually present graphical information to a user. The touch screen display, which may be embodied as any known touch screen display, may also include a touch detection surface configured to enable touch recognition by any suitable technique, such as resistive, capacitive, infrared, strain gauge, surface wave, optical imaging, dispersive signal technology, acoustic pulse recognition, or other like techniques. The touch screen display may include all of the hardware necessary to detect a touch when contact is made with the touch detection surface. A touch event may occur when an object, such as a stylus, finger, pen, pencil or any other pointing device, comes into contact with a portion of the touch detection surface of the touch screen display in a manner sufficient to register as a touch. In this regard, for example, a touch could be a detection of a change in capacitance (e.g., due to physical contact with the surface of the screen or close proximity "hovering" of an object relative to the surface of the screen), pressure on the touch detection surface above a particular pressure threshold over a given area, or the like. The touch screen display may also be configured to generate touch event location data indicating the location of the touch event on the screen. Touch screen display may be configured to provide the touch event location data to other entities (e.g., the processor 20).

In some embodiments, touch screen display may be configured to detect a touch followed by motion across the touch detection surface, which may also be referred to as a gesture. In this regard, for example, the movement of a finger across the touch detection surface of the touch screen display may be detected and touch event location data may be generated that describes the gesture generated by the finger. In other words, the gesture may be defined by motion following a touch thereby forming a continuous, moving touch event defining a moving series of touch positions. The gesture may represent a series of unbroken touch events, or in some cases a combination of separate touch events.

The mobile terminal 10 may further include a user identity module (UIM) 38. The UIM 38 is typically a memory device having a processor built in. The UIM 38 may include, for example, a subscriber identity module (SIM), a universal integrated circuit card (UICC), a universal subscriber identity module (USIM), a removable user identity module (R-UIM), etc. The UIM 38 typically stores information elements related to a mobile subscriber. In addition to the UIM 38, the mobile terminal 10 may be equipped with memory. For example, the mobile terminal 10 may include volatile memory 40, such as volatile Random Access Memory (RAM) including a cache area for the temporary storage of data. The mobile terminal 10 may also include other non-volatile memory 42, which may be embedded and/or may be removable. The memories may store any of a number of pieces of information, and data, used by the mobile terminal 10 to implement the functions of the mobile terminal 10.

An example embodiment of the invention will now be described with reference to FIG. 2, in which certain elements of an apparatus 50 for customizing and controlling a display screen of a user interface, which may display a number of display elements, are depicted. The apparatus 50 of FIG. 2 may be employed, for example, in conjunction with the mobile terminal 10 of FIG. 1. However, it should be noted that the apparatus 50 of FIG. 2, may also be employed in connection with a variety of other devices, both mobile and fixed, and therefore, embodiments of the present invention should not be limited to application on devices such as the mobile terminal 10 of FIG. 1. For example, the apparatus 50 may be employed on a personal computer or other user terminal. Moreover, in some cases, the apparatus 50 may be on a fixed device such as a server or other service platform and the content may be presented (e.g., via a server/client relationship) on a remote device such as a user terminal (e.g., the mobile terminal 10) based on processing that occurs at the fixed device.

It should also be noted that while FIG. 2 illustrates one example of a configuration of an apparatus 50 for controlling and customizing a display screen of a user interface, numerous other configurations may also be used to implement embodiments of the present invention. As such, in some embodiments, although devices or elements are shown as being in communication with each other, hereinafter such devices or elements should be considered to be capable of being embodied within a same device or element and thus, devices or elements shown in communication should be understood to alternatively be portions of the same device or element.

Referring now to FIG. 2, the apparatus 50 for controlling a spatial relationship between at least two groups of content presented upon a display screen is provided and may include or otherwise be in communication with a processor 52, a user interface 54, a communication interface 56 and a memory device 58. In some embodiments, the processor 52 (and/or co-processors or any other processing circuitry assisting or otherwise associated with the processor 52) may be in communication with the memory device 58 via a bus for passing information among components of the apparatus 50. The memory device 58 may include, for example, one or more volatile and/or non-volatile memories. In other words, for example, the memory device 58 may be an electronic storage device (e.g., a computer readable storage medium) comprising gates configured to store data (e.g., bits) that may be retrievable by a machine (e.g., a computing device like the processor 52). The memory device 58 may be configured to store information, data, applications, instructions or the like for enabling the apparatus to carry out various functions in accordance with an example embodiment of the present invention. For example, the memory device 58 could be configured to buffer input data for processing by the processor 52. Additionally or alternatively, the memory device 58 could be configured to store instructions for execution by the processor 52.

The apparatus 50 may, in some embodiments, be a mobile terminal (e.g., mobile terminal 10) or a fixed communication device or computing device configured to employ an example embodiment of the present invention. However, in some embodiments, the apparatus 50 may be embodied as a chip or chip set. In other words, the apparatus 50 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus 50 may therefore, in some cases, be configured to implement an embodiment of the present invention on a single chip or as a single "system on a chip." As such, in some cases, a chip or chipset may constitute means for performing one or more operations for providing the functionalities described herein.

The processor 52 may be embodied in a number of different ways. For example, the processor 52 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 52 may include one or more processing cores configured to perform independently. A multi-core processor may enable multiprocessing within a single physical package. Additionally or alternatively, the processor 52 may include one or more processors configured in tandem via the bus to enable independent execution of instructions, pipelining and/or multithreading.

In an example embodiment, the processor 52 may be configured to execute instructions stored in the memory device 58 or otherwise accessible to the processor 52. Alternatively or additionally, the processor 52 may be configured to execute hard coded functionality. As such, whether configured by hardware or software methods, or by a combination thereof, the processor 52 may represent an entity (e.g., physically embodied in circuitry) capable of performing operations according to an embodiment of the present invention while configured accordingly. Thus, for example, when the processor 52 is embodied as an ASIC, FPGA or the like, the processor 52 may be specifically configured hardware for conducting the operations described herein. Alternatively, as another example, when the processor 52 is embodied as an executor of software instructions, the instructions may specifically configure the processor 52 to perform the algorithms and/or operations described herein when the instructions are executed. However, in some cases, the processor 52 may be a processor of a specific device (e.g., a mobile terminal or other computing device), such as processor 20 of mobile terminal 10 of FIG. 1, adapted for employing an embodiment of the present invention by further configuration of the processor 52 by instructions for performing the algorithms and/or operations described herein. The processor 52 may include, among other things, a clock, an arithmetic logic unit (ALU) and logic gates configured to support operation of the processor 52.

Meanwhile, the communication interface 56 may be any means such as a device or circuitry embodied in either hardware or a combination of hardware and software that is configured to receive and/or transmit data from/to a network and/or any other device or module in communication with the apparatus 50. In this regard, the communication interface 56 may include, for example, an antenna (or multiple antennas) and supporting hardware and/or software for enabling communications with a wireless communication network. Additionally or alternatively, the communication interface 56 may include the circuitry for interacting with the antenna(s) to cause transmission of signals via the antenna(s) or to handle receipt of signals received via the antenna(s). In some environments, the communication interface 56 may alternatively or also support wired communication. As such, for example, the communication interface 56 may include a communication modem and/or other hardware/software for supporting communication via cable, digital subscriber line (DSL), universal serial bus (USB) or other mechanisms.

The user interface 54 may be in communication with the processor 52 to receive an indication of a user input at the user interface 54 and/or to cause provision of an audible, visual, mechanical or other output to the user. As such, the user interface 54 may include, for example, a keyboard, a mouse, a joystick, a display, a touch screen(s), touch areas, soft keys, a microphone, a speaker, or other input/output mechanisms. Alternatively or additionally, the processor 52 may comprise user interface circuitry configured to control at least some functions of one or more elements of the user interface, such as, for example, a speaker, ringer, microphone, display, and/or the like. The processor 52 and/or user interface circuitry comprising the processor 52 may be configured to control one or more functions of one or more elements of the user interface through computer program instructions (e.g., software and/or firmware) stored on a memory accessible to the processor 52 (e.g., memory device 58, and/or the like).

Figure 4:
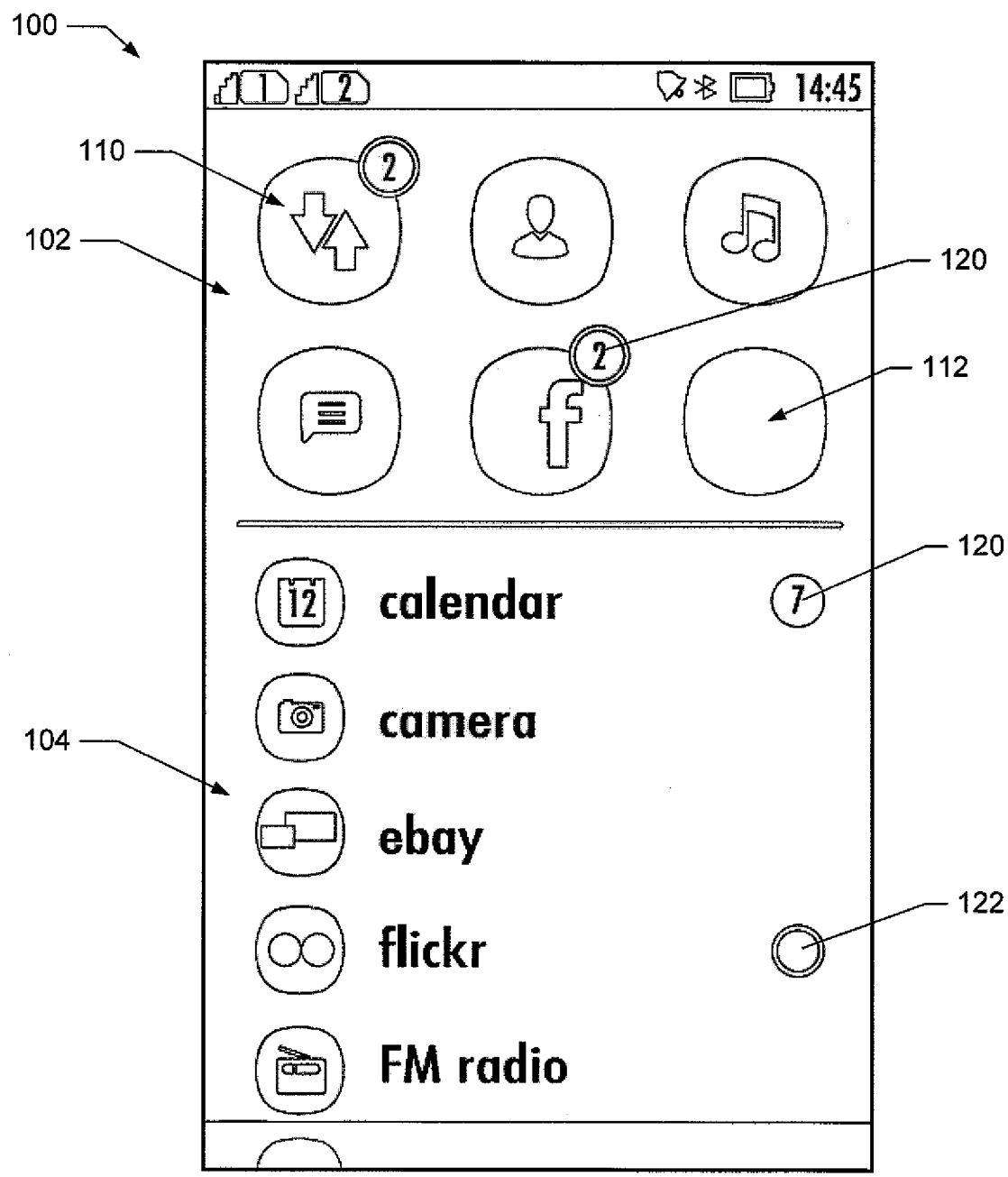

Referring now to FIG. 3, the operations performed by an apparatus 50 in accordance with one example embodiment of the present invention are shown. In this regard, the apparatus may include means, such as the processor 52, the user interface 54 or the like, for causing the presentation of a display screen of a user interface, which may include at least two sections, each consisting of one or more display elements. See operation 60 of FIG. 3. In one embodiment, the display screen is a homescreen with each section comprising an application homescreen, although other types of display screens may also be provided in accordance with other embodiments. In this regard, the display screen may be presented upon a touch screen display or upon any other type of display, such as generically represented by display 28 of FIG. 1. As shown in FIG. 4, a display screen 100 of a user interface may comprise two sections 102, 104, each section comprising a number of display elements 110 and having a predefined spatial relationship respective of the other section. In the illustrated embodiment, the display screen includes a line, e.g., a horizontal line, separating the two sections. In other embodiments, however, the display screen need not include a line or other visible separation between the two sections with the sections, instead, separated only by their predefined spatial relationship.

Each section of the display screen 100 may include any number of display elements 110. The display elements may include icons, symbols, thumbnails or other images that are representative of respective applications, programs and/or the like. According to the illustrated embodiment, a primary section 102 located in an upper region of the display screen of the illustrated embodiment may include a 3×2 grid of icons or display elements, as shown in FIG. 4. However, the grid may consist of any number of finite matrix dimensions and, in other embodiments, the display elements need not be presented in a grid but in any other configuration or ordering that is desired. As shown in FIG. 4, the grid may include one or more blank slots 112 in an instance in which the primary section 102 does not include enough display elements to fill the grid. FIG. 4 illustrates a blank slot configured to receive a display element upon user selection. The blank slot may be represented in the primary section, such as by a shadow or outline, so as to remind the user that an additional display element could be added to the primary section. In one embodiment, the primary section may only receive an additional display element, such as an icon or indicator associated with an application, program and/or the like, if an available slot is blank. In other embodiments, however, the primary section may be expanded to receive one or more additional display elements even all slots of the grid are otherwise filled. In instances in which all slots of the grid are filled, the addition of another display element may cause another of the display elements that previously filled a slot in the grid to be removed from the primary section. For example, the display element that is accessed least frequently may be removed from the primary section. Alternatively, the addition of another display element to a primary section in which all of the slots were previously filled may cause each of the display elements to be resized or otherwise reconfigured so as to continue to display each of the display elements.

The display elements 110 that comprise the primary section 102 may be identified in various manners. According to one embodiment of the present invention, the primary section of display elements may be selected, arranged, and/or customized based upon a user's individual preferences. As such, a user may dictate which display elements are included within the primary section. In another embodiment, the primary section of display elements may include icons associated with various applications based upon the location of the device, the frequency with which a user selects or otherwise executes a particular application, the time of day and/or the like. Accordingly, the primary section of display elements may change upon a user's input or based on the contextual state of the device. For example, the apparatus 50, such as the processor 52, may determine the location of the device, such as based upon the time of day, based upon the presence of other neighboring devices or the like, and may tailor the display elements in the primary section based upon the location so as to present those display elements with which the user is most likely to interact within the primary section. In an instance in which the apparatus, such as the processor, determines that the device is in an office environment, the primary section may be populated with display elements that are most frequently accessed by the user while at work. Conversely, in an instance in which the apparatus, such as the processor, determines that the device is at home, the primary section may be populated with display elements that are most frequently accessed by the user while at home.

As shown in FIG. 4, the display elements 110 may further include notification indicators 120 that indicate that the respective application has a new item. In the illustrated embodiment, for example, the Call Log, Facebook, and Calendar application icons include a notification indicator providing the user a notification about new items associated with the respective applications. Although not shown in conjunction with the primary section 102, the display elements may include a notification indicating the application, program and/or the like is a new application or program that has not been previously used, or an indicator providing presence information. The indicators may be at least partly overlaid upon the display elements. However the indicators may be associated with the display elements in other manners in other embodiments.

As shown in FIG. 4, the display screen 100 may also include a secondary section 104 of display elements 110, such as shown in a lower portion of the display in the illustrated embodiment. The secondary section may have display elements configured in a different manner than the primary section 102. In an embodiment in which the primary section includes display elements arranged in a grid, the secondary section may include display elements arranged in different ordering, such as a listing e.g., an alphabetical listing. However, the primary and secondary sections may have other configurations or orderings in other embodiments. The secondary section may include a different number of display elements than the primary section, such as unlimited number of display elements in one embodiment. In order to further distinguish the primary and secondary sections, the display elements may include different information. Accordingly, the primary section of display elements may include icons that do not include the title of the application, program and/or the like associated with the icon, while the display elements of the secondary section may include the title of the application, program and/or the like. Further, as shown in FIG. 4, the primary section of display elements may include icons that are sized larger than the secondary section of display elements. The display elements of the primary and secondary sections may also or alternatively be distinguished in a number of other manners including color, shading or color saturation of the display elements, tactile feedback upon touch of the display elements and/or the like. As described above in conjunction with the display elements of the primary section, the secondary section may include indicators, such as notification indicators 120, new application indicators 122, presence indicators or the like. For example, FIG. 4 illustrates a new application indicator for the Flickr application. In order to further distinguish the secondary section from the primary section, the indicators may be associated with the respective display elements in a different manner, such as by being positioned alongside of a display indicator in the secondary section and in a partially overlapping relationship in the primary section.

In one embodiment of the present invention, the display screen of the user interface 54 may be configured such that display elements of the primary and secondary sections are mutually exclusive. For example, a display element located within the primary section of this embodiment would not be displayed within the secondary section. Alternatively, the display screen may be configured to allow a display element to be located within both the primary and secondary sections.

Figure 5:
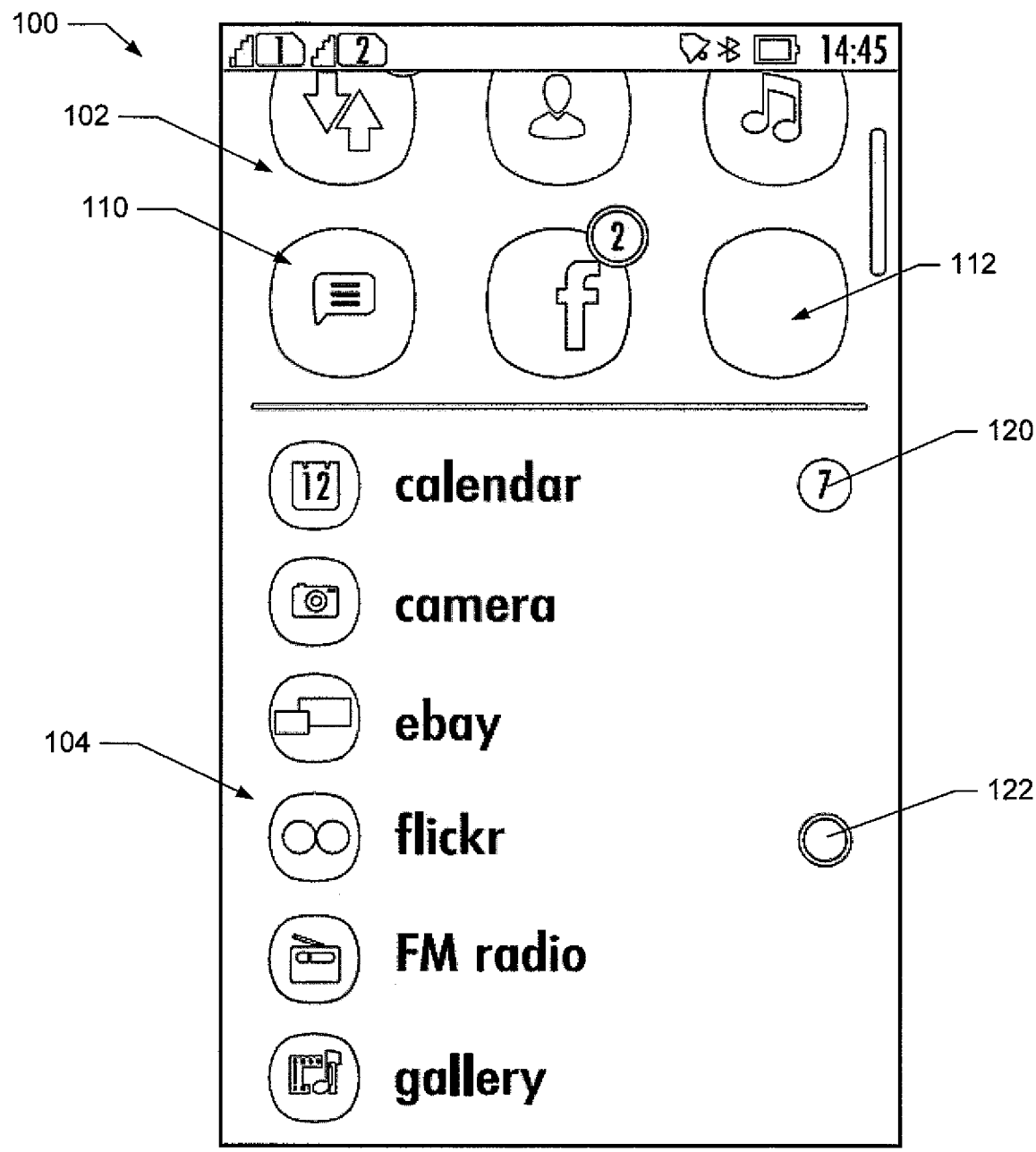

The apparatus 50 may include means, such as the processor 52, user interface 54 or the like, for enabling scrolling or other movement of at least a portion of the display screen, such as in response to user input. In the embodiment of FIG. 5, each section of the display screen may scroll together. In other embodiments of the present invention, however, the sections of display elements may be configured to scroll independently from one another. In such an embodiment, a primary section of display elements, located, for example, near the top portion of the display in the illustrated embodiment, may remain stationary or be compressed from a visual standpoint so as to occupy a smaller percentage of the display, while a secondary section of display elements, located, for example, near the bottom portion of the display is scrolled according to a user's input. Further, the apparatus 50 may also include means, such as the processor 52, the user interface 54 or the like, for receiving an input indicating a selection of one of the display elements. See operation 64 of FIG. 3. In accordance with an example embodiment of the present invention, the apparatus 50 may also include means, such as the processor 52, the user interface 54 or the like, for causing an operation associated with a display element to be performed, such as in response to selection of the display element. See operation 66 of FIG. 3.

As shown in FIG. 4 in which a display screen is presented upon a display of the user interface 54, the user may provide an input selecting one of the display elements, such as by providing a touch input to the touch screen display. The user input may be provided in a variety of manners, with the various touch inputs providing different functionality. According to one embodiment of the present invention, a user may provide an input to the display consisting of a short tap, which may cause the apparatus 50, such as the processor 52, to perform an operation associated with the selected display element, such as opening an application represented by the display element. In another embodiment, a user may provide an input to the display consisting of a long tap, which may cause the apparatus 50, such as the processor 52, to perform an operation associated with the selected display element, such as enabling the display element to be moved between sections of the display screen of the user interface 54. While the input may be provided (and, by way of example, will be hereinafter discussed) by the placement of a user's finger upon or near a touch screen display, the input may be performed in a number of other manners, such as by other types of pointing devices, such as styluses, pens, pencils or the like, that may be brought into operative contact with a touch screen display, or by appropriately positioning a cursor in partial alignment with a respective display element, such as by means of a mouse, touchpad or the like, followed by selection of the respective display element.

Figure 6:
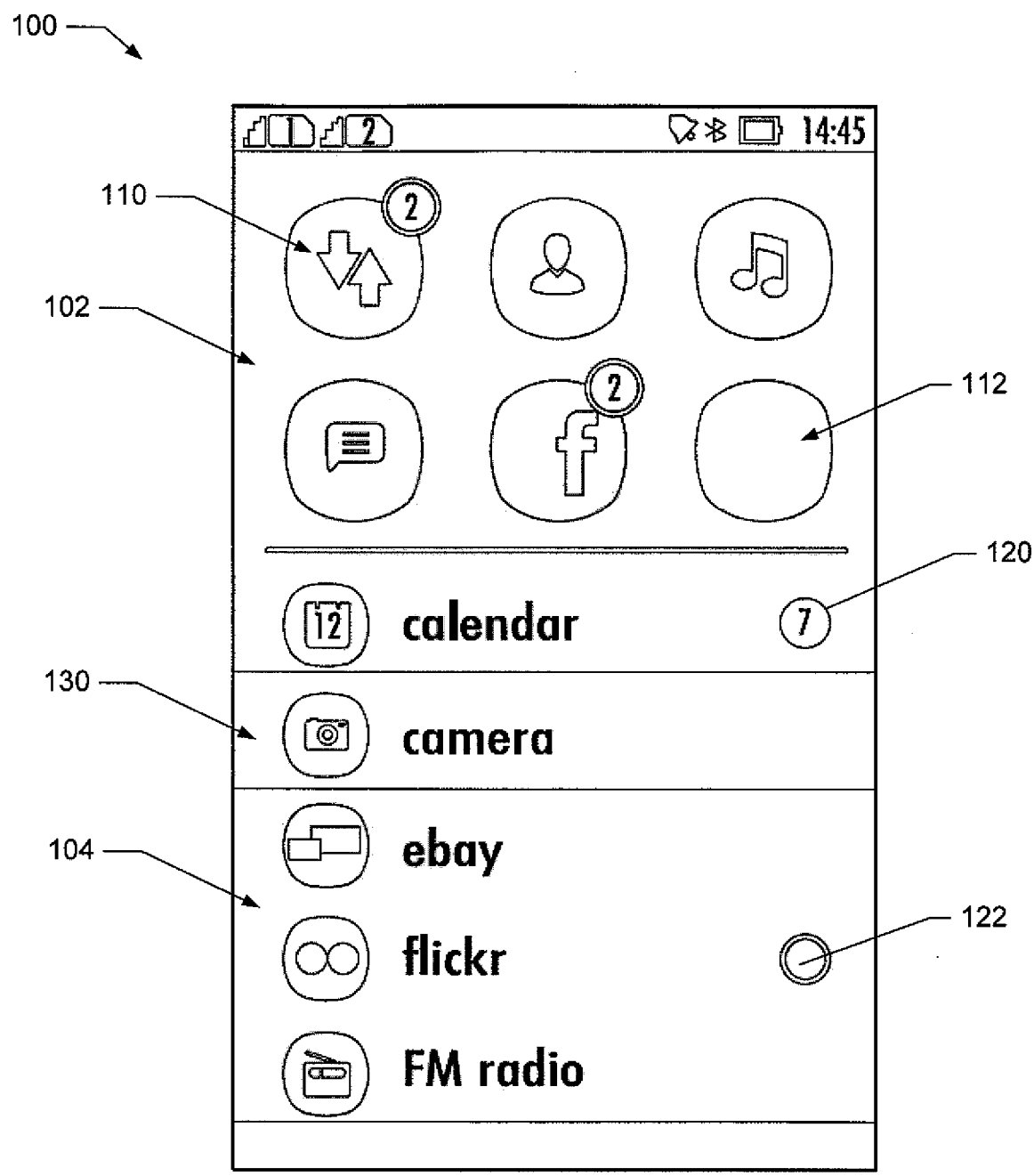

As shown in FIG. 6, the display screen 100 of the user interface 54 may be configured to indicate the selection 130 of one of the display elements 110, such as by highlighting or otherwise increasing the brightness associated with the selected display element, e.g., the camera application icon. And, as noted above, various operations may be performed in response to the selection of a display element with the operation depending, in one embodiment, upon the manner in which the display element is selected, e.g., long tap vs. short tap. For example, if a user provides an input comprising a short tap upon a display element, such as the camera application icon as shown in FIG. 6, the apparatus 50, such as the processor 52, may be configured to open the camera application. Alternatively, if a user provides an input comprising a long tap upon a display element, such as the camera application icon, the apparatus 50, such as the processor 52, may be configured to enable the display element to be moved from one section to another section of the display screen.

As shown in FIGS. 7a and 8a, a user may provide a long tap input indicating a selection 130 of display element 110 after scrolling of the display screen 100 has caused the display of the secondary section 104 only. Specifically, FIG. 7a illustrates the selection of the camera application icon, while FIG. 8a illustrates the selection of the media player application icon. Upon receiving such an input, the apparatus 50, such as the processor 52, may be configured to display both sections of the display screen with the selected display element 140 being moveable, as shown in FIGS. 7b and 8b. According to one embodiment, the display parameters of the selected moveable display element may also be altered in response to its selection, such as by presenting the display element in a magnified manner, such as with a greater number of pixels, and/or with reduced opacity. If desired, the user may then provide input, such as a dragging and dropping gesture, to move the selected display element, such as from one section to another or the like.

Figure 9:
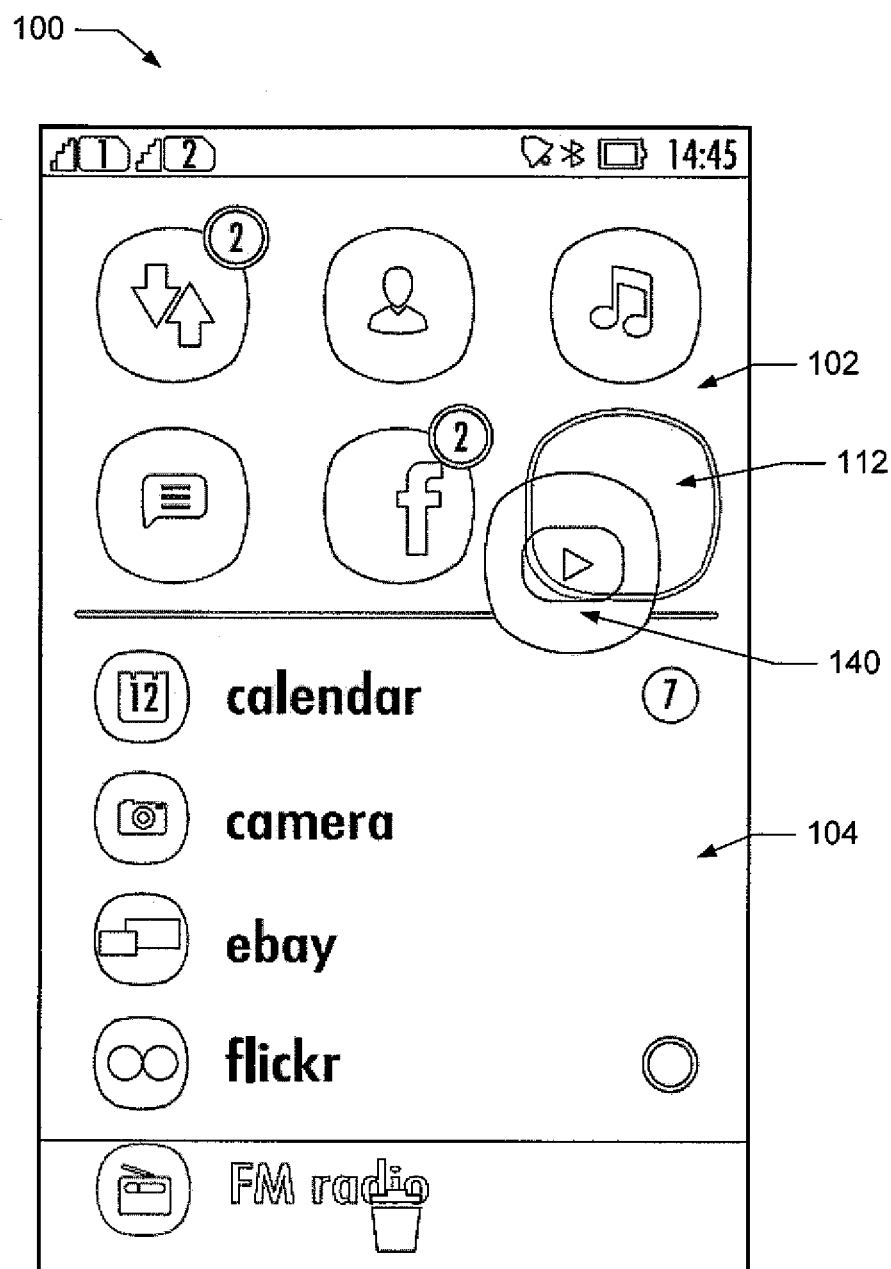

In this regard and as shown in FIG. 9, the selected movable display element 140, shown as the media player application icon for example, may be moved around the screen 100 according to a user's input. In an embodiment employing a touch screen display, for example, a user place his finger on the selected display element and may then drag his finger across the touch screen display, thereby moving the selected moveable display element from the secondary section 104 to the primary section 102. FIG. 9 further illustrates the highlighting of an empty grid slot 112 when a selected moveable display element is positioned close to the empty grid slot in order to alert the user as to the relative position of the selected display element within the primary section.

Figure 10:
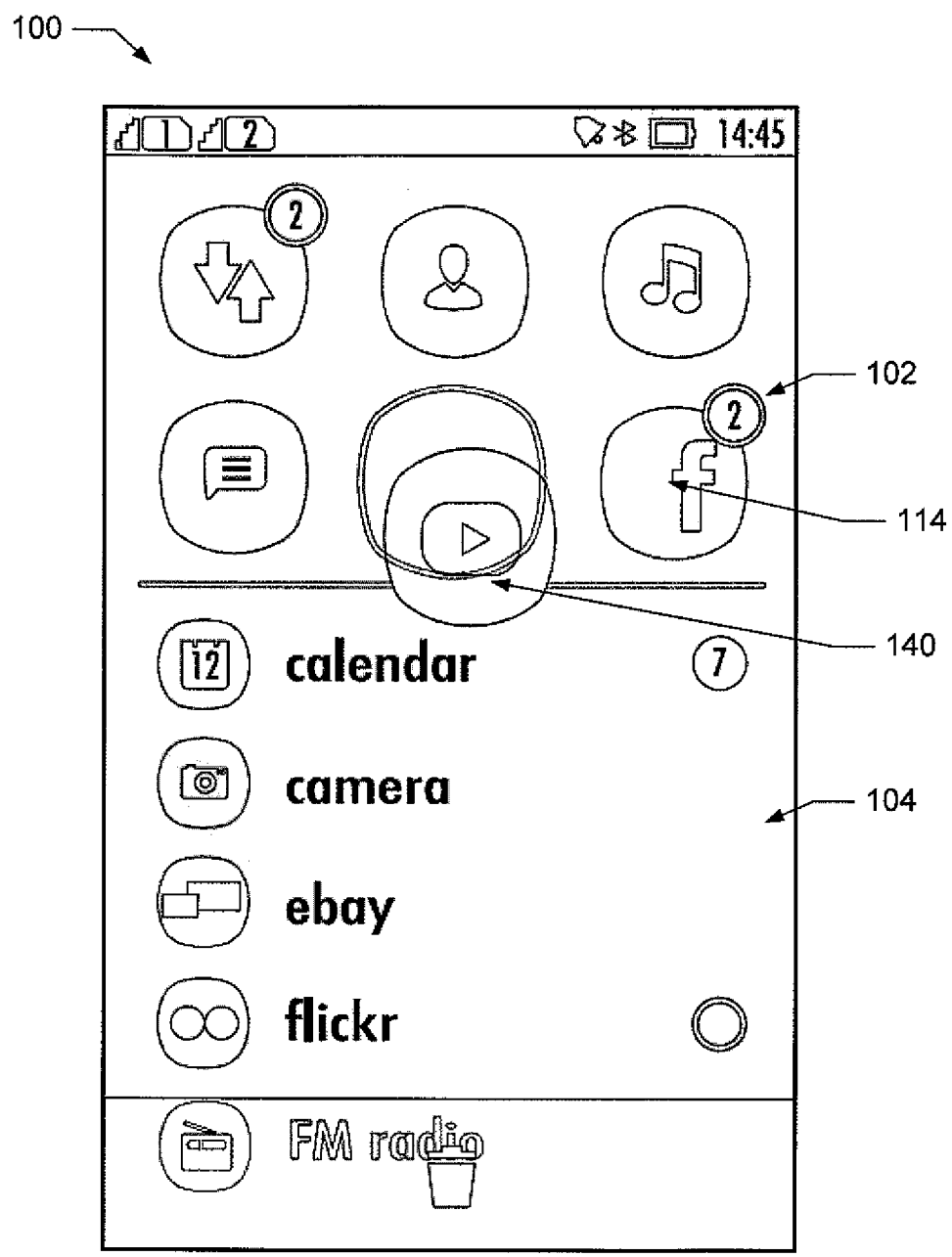

As shown in FIG. 10, the apparatus 50, such as the processor 52, may be configured to detect a collision between a selected moveable display element 140 and at least one of the display elements 110 located within the grid of the primary section 102. As such, when a collision has been detected between a display element 114 previously located within the grid and the selected moveable display element, such as a result of the selected display element being placed in an at least partly overlapping relationship to one of the prior display elements, the display element previously located within the grid may move to a different position within the grid matrix to allow the selected moveable display element to be positioned in its location. For example, FIG. 10 illustrates the selected moveable display element, the media player application icon, being positioned at a location previously occupied by the Facebook application icon. Based in part on the detected collision with the media player application icon, the apparatus 50, such as the processor 52, has moved the Facebook application icon to a different position within the grid matrix to allow the media player application icon to be positioned within the grid.

As shown in FIG. 11a and FIG. 11b, a selected moveable display element 140 may be moved from the primary section 102 of display elements 110 to the secondary section 104 of display elements. According to one embodiment, a user may provide an input consisting of a long tap to select and move a display element, such as the Facebook application icon. After providing such an input, the apparatus 50, such as the processor 52, the user interface 54 or the like, may cause the appearance of the display element to be changed to indicate that the display element is selected and moveable, such as by highlighting the borders of the display element, increasing the size of the display element, decreasing the opacity of the display element and/or the like, as shown in FIG. 11a. In one embodiment, the selected icon may increase in size by a predetermined amount, such as 120%, and be displayed at a lower opacity, such as at approximately 80% opacity. When a selected moveable display element, such as the Facebook application icon as shown in FIG. 11b, is moved from the primary section of display elements to the secondary section of display elements, the apparatus 50, such as the processor 52, may also change the appearance of the secondary section of display elements, such as by highlighting the secondary section or bounding the secondary section with borders, to indicate the selected moveable display element may be placed within the secondary section of display elements. As such, according to one embodiment, a bounding box 105 surrounding the secondary section of display elements may indicate to the user that the selected moveable display element may be placed anywhere within the bounding box in order to move the selected moveable display element from the primary section to the secondary section.

Figure 11D:
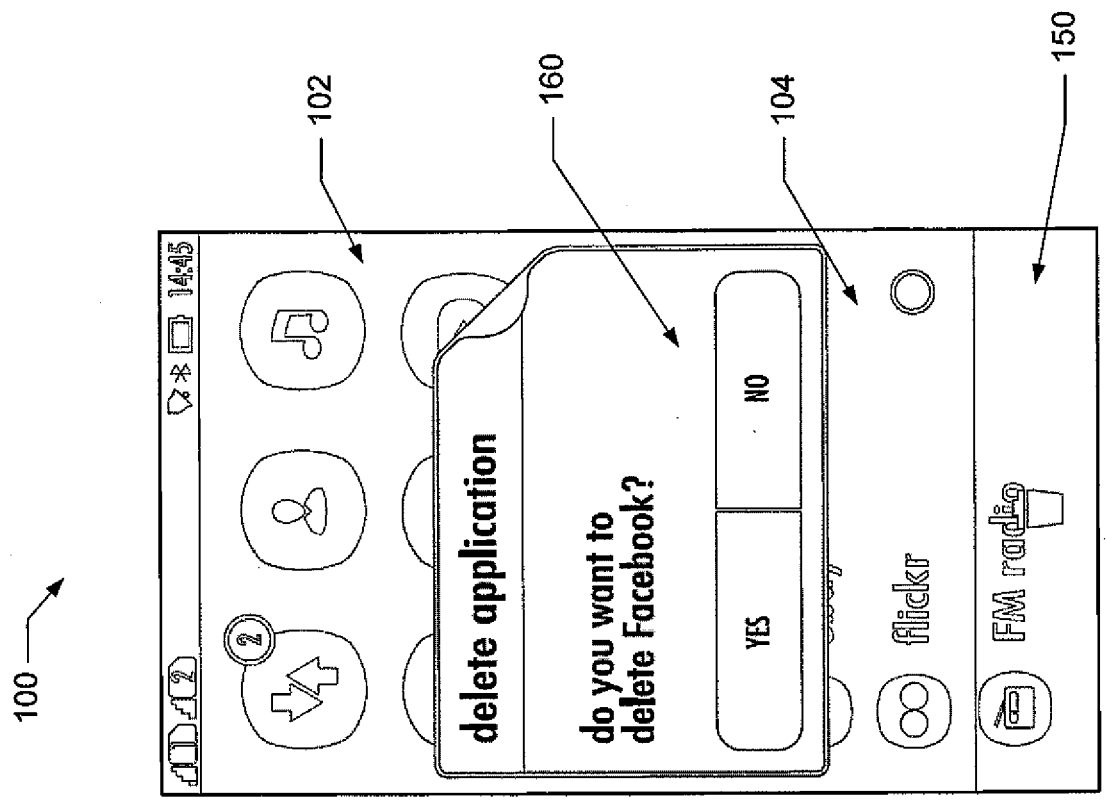
Figure 11C:
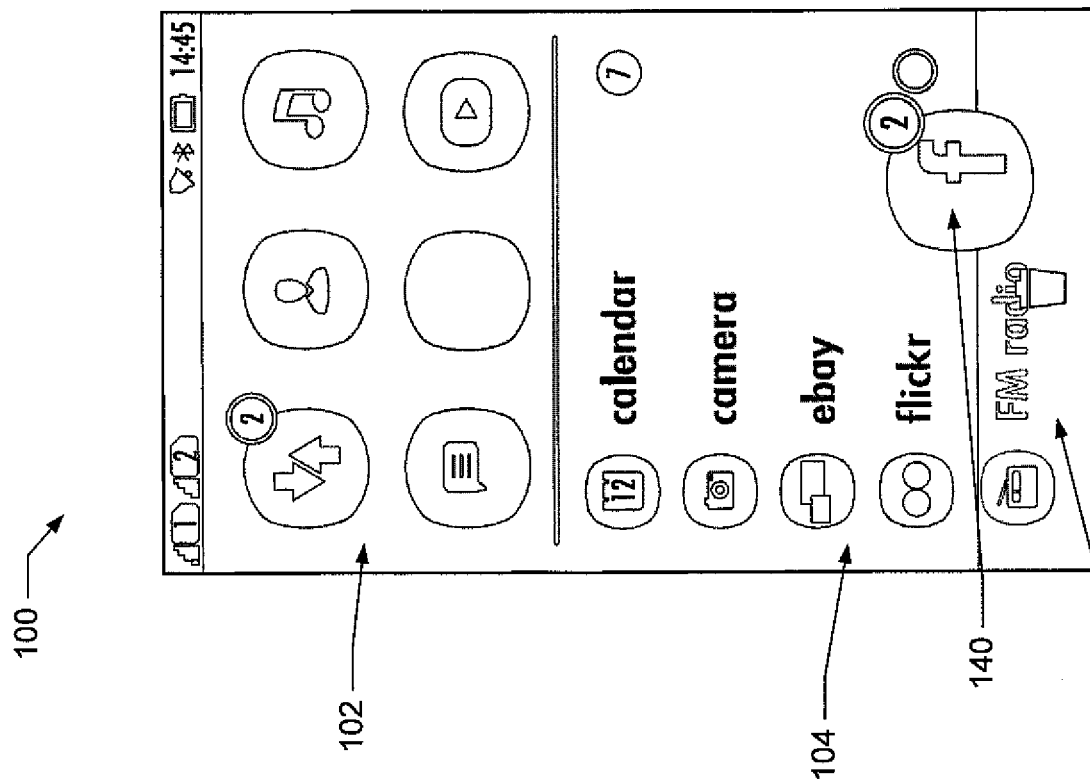
Figure 11E:
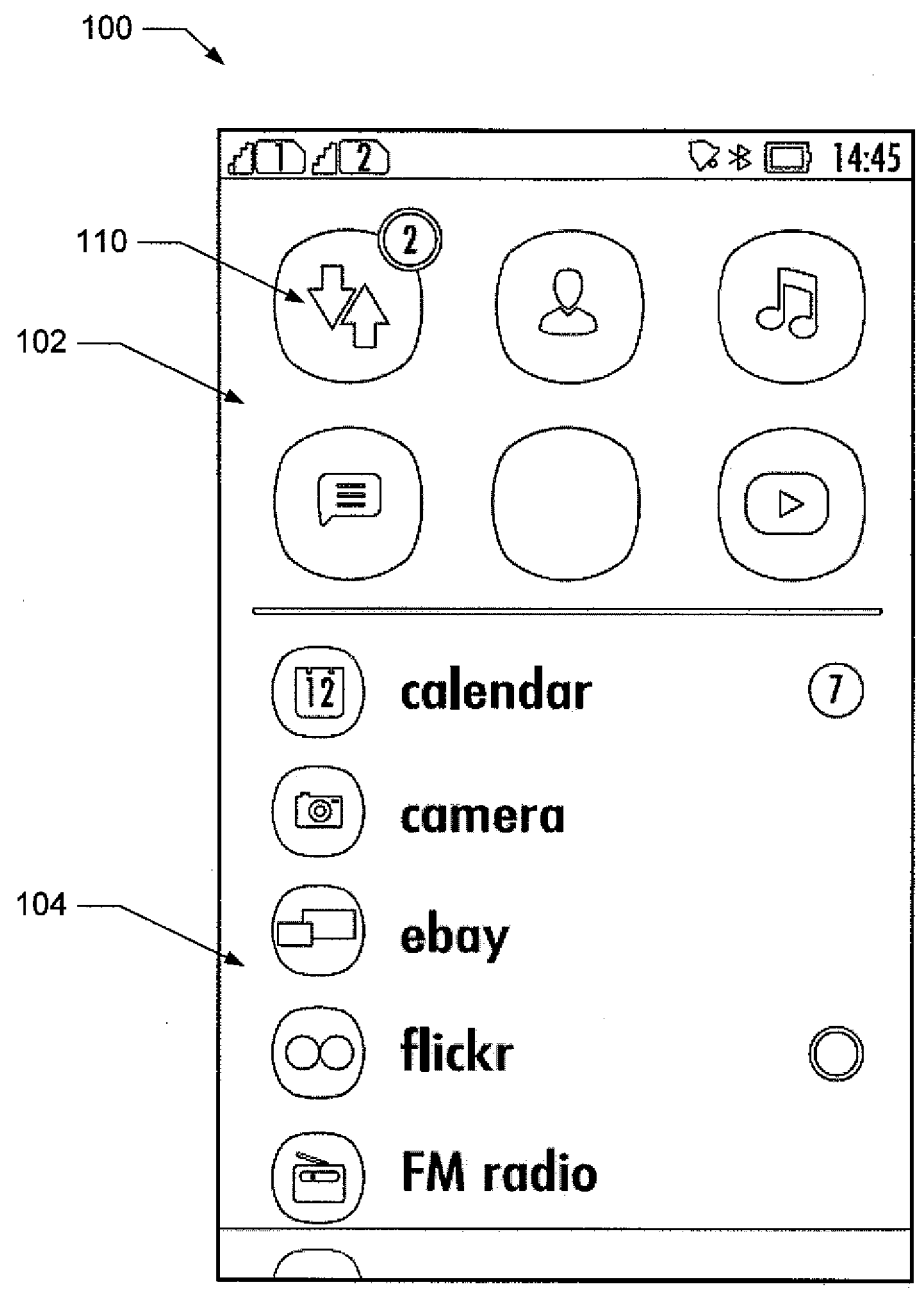

As shown in FIG. 11c, the apparatus 50, such as the processor 52, may be configured to remove a selected moveable display element 140, such as the Facebook application icon, from the display screen 100 entirely. In one such embodiment in which a touch screen display is utilized, a user may provide a touch input consisting of dragging his finger across the screen in a motion corresponding to dragging the application from one position to a trash can display element 150 located near the bottom of the touch screen display. As mentioned previously, the display elements may be configured to detect a collision such that the trash can display element may detect a collision between the trash can display element and the selected moveable display element. According to one embodiment, the trash can display element may be configured to flash, highlight, or otherwise visually indicate the detected collision between the trash can display element and the selected moveable display element, such as the Facebook application icon as shown in FIG. 11c. As such, if a user terminates the touch gesture input by removing his finger from the touch screen display while the selected moveable display element has collided with the trash can display element, the display screen of the user interface may be configured to display a message 160 confirming the deletion of the application associated with the selected moveable display element, as shown in FIG. 11d. In another embodiment of the present invention, the display screen of the user interface 54 may be configured to delete the selected moveable display element if a user terminates the touch gesture input by removing his finger from the touch screen display while the selected moveable display element has collided with the trash can display element without displaying a confirmation message. FIG. 11e illustrates a display screen of the user interface after the Facebook application icon has been deleted.

Although the display screen described heretofore has included two sections, the apparatus 50 of embodiments of the present invention may include a cause a display screen of a user interface 54 to be presented with any number of sections, such as three or more sections. While each of the sections may be displayed at all times, one or more of the sections may only be displayed in response to a predefined type of user input. For example, according to one embodiment, a display screen of a user interface 54 may include a primary section comprising a grid of display elements and a secondary section comprising a list of display elements. When a user provides an input selecting a display element, the apparatus 50, such as the processor 52, of one embodiment may be configured to modify the display screen so as to include a third section of display elements. In this embodiment, for example, the display elements of the third section may be associated with the user selected display element. As such, when a user selects a display element form the primary section of display elements, such as a map application icon, a third section of display elements may be displayed between the primary and secondary sections of the display screen. The third section of display elements may include display elements associated with various functions and/or operations related to the selected display element, such as icons associated with map application functions like "show current location", "route to home", "see friends on map" and/or the like. In another embodiment of the present invention, the third section of display elements may replace the secondary section of display elements, either partly or entirely. According to another embodiment, a user may provide a touch input, such as a long tap, a double tap, a tap and swipe gesture and/or the like, upon a display element in order to cause the display of the third section of display elements.

As described above, FIG. 3 is a flowchart of a method and program product according to an example embodiment of the invention. It will be understood that each block of the flowchart, and combination of blocks in the flowchart, may be implemented by various means, such as hardware, firmware, processor, circuitry and/or other device associated with execution of software including one or more computer program instructions. For example, one or more procedures described above may be embodied by computer program instructions. In this regard, the computer program instructions which embody the procedures described above may be stored by a memory device of a user terminal (either mobile or fixed) and executed by a processor in the user terminal. As will be appreciated, any such computer program instructions may be loaded onto a computer or other programmable apparatus (e.g., hardware) to produce a machine, such that the instructions which execute on the computer or other programmable apparatus create means for implementing the functions specified in the flowchart block(s). These computer program instructions may also be stored in a non-transitory computer-readable memory that may direct a computer or other programmable apparatus to function in a particular manner, such that the instructions stored in the computer-readable memory produce an article of manufacture which implements the functions specified in the flowchart block(s). The computer program instructions may also be loaded onto a computer or other programmable apparatus to produce a computer-implemented process such that the instructions which execute on the computer or other programmable apparatus implement the functions specified in the flowchart block(s).

Accordingly, blocks of the flowchart support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe some example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:

causing at least one display element to be displayed on a home screen of a device, wherein the display elements that are displayed are divided into at least two sections of the home screen having a predefined spatial relationship there between and wherein the display elements that are displayed within one section are presented with respective titles associated with the display elements and the display elements within the other section are displayed without the respective titles, wherein the display elements displayed in one of the at least two sections of the home screen are determined based on a contextual state of the device;

receiving an input indicating a selection of a display element within one section; and causing, via a processor, based at least in part on the input, the performance of an operation associated with the display element that has been selected.

2. A method according to claim 1 wherein causing the at least one display element to be displayed comprises causing the display of the display elements of one section to be presented in a different ordering than the display elements of another section.

3. A method according to claim 1 wherein causing the at least one display element to be displayed comprises causing the display elements of one section to be larger than the display elements of another section.

4. A method according to claim 1 wherein causing the performance of an operation comprises causing the display of a third group of display elements corresponding to the selected display element.

5. A method according to claim 1 wherein causing the performance of an operation comprises enabling the selected display element to be moved on the display.

6. An apparatus comprising:

at least one processor; and at least one memory including computer program code configured to, with the at least one processor, cause the apparatus to perform at least the following:

cause at least one display element to be displayed on a home screen of a device, wherein the display elements that are displayed are divided into at least two sections of the home screen having a predefined spatial relationship therebetween and wherein the display elements that are displayed within one section are presented with respective titles associated with the display elements and the display elements within the other section are displayed without the respective titles, wherein the display elements displayed in one of the at least two sections of the home screen are determined based on a contextual state of the apparatus;

receive an input indicating a selection of a display element within one section; and cause, based at least in part on the input, the performance of an operation associated with the display element that has been selected.

7. An apparatus according to claim 6 wherein the at least one memory including computer program code is configured to, with the at least one processor, cause the apparatus to cause the at least one display element to be displayed by causing the display of the display elements of one section to be presented in a different ordering than the display elements of another section.

8. An apparatus according to claim 6 wherein the at least one memory including computer program code is configured to, with the at least one processor, cause the apparatus to cause the at least one display element to be displayed by causing the display elements of one section to be larger than the display elements of another section.

9. An apparatus according to claim 6 wherein the at least one memory including computer program code is configured to, with the at least one processor, cause the apparatus to cause the performance of an operation by causing the display of a third group of display elements corresponding to the selected display element.

10. An apparatus according to claim 6, wherein the at least one memory including computer program code is further configured to, with the at least one processor, cause the apparatus to:
cause the selected display element to be removed from at least one group; and
cause the selected display element to be placed in at least another group.

11. An apparatus according to claim 6, wherein the at least one memory including computer program code is further configured to, with the at least one processor, cause the apparatus to cause the selected display element to be removed from each of the groups.

12. A computer program product comprising a non-transitory computer-readable storage medium and computer executable program code portions stored therein which, when executed by at least one processor of an apparatus, causes the apparatus to perform
causing at least one display element to be displayed on a home screen of a device, wherein the display elements that are displayed are divided into at least two sections of the home screen having a predefined spatial relationship therebetween and wherein the display elements that are displayed within one section are presented with respective titles associated with the display elements and the display elements within the other section are displayed without the respective titles, wherein the display elements displayed in one of the at least two sections of the home screen are determined based on a contextual state of the apparatus;

receiving an input indicating a selection of a display element within one section; and causing, based at least in part on the input, the performance of an operation associated with the display element that has been selected.

13. A computer program product according to claim 12 wherein the computer executable program code portions, when executed by at least one processor of an apparatus causes the apparatus to perform causing the display of the display elements of one section to be presented in a different ordering than the display elements of another section.

14. A computer program product according to claim 12 wherein the computer executable program code portions, when executed by at least one processor of an apparatus causes the apparatus to perform causing the display elements of one section to be larger than the display elements of another section.

15. The method according to claim 1, wherein the contextual state of the device is based on a location of the device.

16. The method according to claim 1, wherein the contextual state of the device is based on a time.

17. The apparatus according to claim 6, wherein the contextual state of the apparatus is based on a location of the device.

18. The apparatus according to claim 6, wherein the contextual state of the apparatus is based on a time.

19. The computer program product according to claim 12, wherein the contextual state of the apparatus is based on a location of the device.

20. The computer program product according to claim 12, wherein the contextual state of the apparatus is based on a time.

21. The method of claim 1, wherein the display elements displayed in a primary section do not include the respective titles and the display elements displayed in a secondary second include the respective titles.

22. The apparatus according to claim 6, wherein the display elements displayed in a primary section do not include the respective titles and the display elements displayed in a secondary second include the respective titles.

23. The computer program product according to claim 12, wherein the display elements displayed in a primary section do not include the respective titles and the display elements displayed in a secondary second include the respective titles.

\* \* \* \* \*